(12) United States Patent
Chi et al.

(10) Patent No.: US 8,203,502 B1
(45) Date of Patent: Jun. 19, 2012

(54) WEARABLE HEADS-UP DISPLAY WITH INTEGRATED FINGER-TRACKING INPUT SENSOR

(75) Inventors: Liang-Yu Chi, San Francisco, CA (US); Luis Ricardo Prada Gomez, Hayward, CA (US); Robert Allen Ryskamp, Zurich (CH); Sanjay G Mavinkurve, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/115,430

(22) Filed: May 25, 2011

(51) Int. Cl.
*G09G 5/00* (2006.01)
(52) U.S. Cl. .................................. 345/7; 359/630
(58) Field of Classification Search .............. 345/7–9; 359/630
See application file for complete search history.

(56) References Cited

U.S. PATENT DOCUMENTS

| | | | |
|---|---|---|---|
| 5,790,184 A | 8/1998 | Sato | |
| 6,349,001 B1 | 2/2002 | Spitzer | |
| 6,424,338 B1 * | 7/2002 | Anderson | 345/173 |
| 7,461,355 B2 | 12/2008 | SanGiovanni | |
| 7,719,521 B2 | 5/2010 | Yang et al. | |
| 7,958,457 B1 | 6/2011 | Brandenberg et al. | |
| 2006/0012566 A1 | 1/2006 | Siddeeq | |
| 2006/0061544 A1 | 3/2006 | Min | |
| 2006/0119539 A1 | 6/2006 | Kato | |
| 2006/0132382 A1 | 6/2006 | Jannard | |
| 2008/0239523 A1 | 10/2008 | Beck | |
| 2010/0079356 A1 | 4/2010 | Hoellwarth | |
| 2010/0149073 A1 | 6/2010 | Chaum | |
| 2010/0220037 A1 * | 9/2010 | Sako et al. | 345/8 |

FOREIGN PATENT DOCUMENTS

| | | |
|---|---|---|
| JP | 10123450 A | 5/1998 |
| WO | 9409398 A1 | 4/1994 |

OTHER PUBLICATIONS

Williams, George; Faste, Haakon; McDowall, Ian; Bolas, Mark; Physical Presence—Palettes in Virtual Spaces, Proceedings of the 3rd Annual Immersive Projection Technologies Workshop, pp. 65-75, 1999.

Cameron, A.A., "Visor projected helmet mounted displays technology and applications", Microprocessors and Microsystems 22 (1999) p. 465-475.

(Continued)

*Primary Examiner* — Ke Xiao
(74) *Attorney, Agent, or Firm* — McDonnell Boehnen Hulbert & Berghoff LLP

(57) ABSTRACT

Disclosed are systems, methods, and devices for interfacing with a wearable heads-up display via a finger-operable input device. The wearable heads-up display may include a display element for receiving and displaying display information received from a processor, and may also include a wearable frame structure supporting the display element and having a projection extending away from the display element. The projection may be configured to secure the heads-up display to a user's body in a manner such that the display element is disposed within a field of view of the user. A finger-operable input device secured to the wearable frame structure is configured to sense at least one of a position and movement of a finger along a planar direction relative to a surface of the input device, and to provide corresponding input information to the processor.

12 Claims, 8 Drawing Sheets

OTHER PUBLICATIONS

Spitzer, M.B.; Rensing, N.M.; McClelland, R.; Aquilino, P., "Eyeglass-based systems for wearable computing," Wearable Computers, 1997. Digest of Papers., First International Symposium on , vol., No., pp. 48-51, Oct. 13-14, 1997.

Zieniewicz, M.J.; Johnson, D.C.; Wong, C.; Flatt, J.D.; , "The evolution of Army wearable computers," Pervasive Computing, IEEE , vol. 1, No. 4, pp. 30-40, Oct.-Dec. 2002.

* cited by examiner

WEARABLE HEADS-UP DISPLAY WITH INTEGRATED FINGER-TRACKING INPUT SENSOR

BACKGROUND

Unless otherwise indicated herein, the materials described in this section are not prior art to the claims in this application and are not admitted to be prior art by inclusion in this section.

Various technologies can be utilized to display information to a user of a system. Some systems for displaying information may utilize "heads-up" displays. A heads-up display can be incorporated into a pair of goggles, glasses, a headband, a helmet, or other such device that the user can wear. A heads-up display is typically positioned near the user's eyes and calibrated and/or aligned to the user's field of view to allow the user to review displayed information with little or no head movement. The display may also be transparent or translucent, allowing the user to view and interact with the surrounding environment while wearing the heads-up display. In some cases, the display may not be transparent, but may project a captured image of the environment on the display to simulate transparency or translucency. In other cases, the display may be formed directly on a user's retina via a low-powered laser scanning technique. To generate display information such as images and text for display, a computer processing system may be used. Such heads-up displays have a variety of applications, such as aviation information systems, vehicle navigation systems, and video games, among others.

For example, in aviation information systems, display information may include airspeed, altitude, a horizon line, heading, turn/bank, and slip/skid indicators. Display information may also include aviation data and symbols for use in approaches and landings. For example, a flight guidance system in the heads-up display can provide visual cues based on navigation aids such as an Instrument Landing System or augmented Global Positioning System. Other aviation uses are possible as well. In the automotive field, display information may include speedometer, tachometer, and navigation system displays. Additionally, night vision information may be displayed to aid in night driving. Other automotive uses are possible as well.

As more and more applications and uses are being developed for head-mounted display devices, more complex interactions have arisen. For example, in the aviation context, a pilot may need to interface with the information being displayed in the heads-up display, perhaps to switch between a parameter display interface (e.g., displaying airspeed, altitude, a horizon line, heading, etc.) and an approach/landing display interface.

Other, more complex interactions may also be necessary. For example, a pilot may wish to interact with other pilots in the sky, and/or send information to one or more selected pilots. Current solutions, such as buttons, are limited in their functionality, and generally increase bulk, block light, and/or reduce peripheral vision due to their size, location, and composition requirements.

SUMMARY

Disclosed herein are improved methods and devices for controlling and interfacing with a wearable heads-up display. In an exemplary embodiment, the wearable heads-up display may include a processor, a display element configured to receive display information from the processor and to display the display information, a wearable frame structure supporting the display element and having a projection extending away from the display element, the projection securing the heads-up display to a user's body in a manner that, when secured, places the display element within a user's field of view, and a finger-operable input device secured to the wearable frame structure and configured to sense at least one of a position and movement of a user's finger along a planar direction relative to a surface of the input device, and to provide corresponding input information to the processor. In this manner, an improved method and device for interfacing with, and providing input to, the wearable heads-up display may be provided. For example, in response to receiving input at the processor from the finger-operable input device, the processor may transmit new display information to the display element. Further input could cause further updates to the display information or may cause the processor to execute other functions.

In another exemplary embodiment, the display information may include at least one possible input operation that may be made via the input device and one of a function and a selection associated with the input operation. For example, a list of four options may be provided on the display element via the display information, and an indication of an associated input operation to select or execute each one of the four options may be simultaneously provided. In one example, an upwards facing arrow may be displayed next to the first of the four options, indicating that an upwards swipe across the input device may select the first option, while a downwards facing arrow may be displayed next to the second of the four options, indicating that a downwards swipe across the input device may select the second option. Forwards and backwards facing arrows may be displayed on the display element with respect to the remaining two of the four options, and respective forwards and backwards swipes across the input device may select between the remaining two options. Other symbols could be used for other input actions, such as a single circle for a single tap, and a double circle (adjacent or within one another) for a double tap. Other types of swiping patterns (e.g., gestures) and other types of functions are possible as well.

In one embodiment, the heads-up display may include two display elements coupled together via the wearable frame structure. In one example, the wearable frame structure may be a pair of glasses comprising two projections disposed on opposite sides of the two display elements (e.g., lenses), each projection extending away from each respective lens display element. The finger-operable input device may then be secured to the wearable frame structure via a first of the two projections. Furthermore, a second finger-operable input device may be secured to the wearable frame structure via a second of the two projections and configured to sense at least one of a position and movement of a finger along a planar direction relative to a surface of the second input device, and to provide corresponding input information to the processor. Such a configuration allows the same wearable heads-up display to be operated by both right-handed and left-handed users. Furthermore, the dual-input structure allows for an input system where the first finger-operable input device is configured to provide fine-motor input information to the processor and the second finger-operable input device is configured to provide gross-motor input information to the processor.

Due to the location of the finger-operable input device(s) on the stem of the glasses, the stems and/or input devices may block or hinder the peripheral vision of the user and/or block light from reaching a user's eyes. In order to prevent such an occurrence, and in one embodiment, the input device(s) may be translucent. In another example, the input device(s) may be substantially transparent. For example, the input devices may be built upon a translucent or substantially transparent glass or plastic substrate. Metal conductor sensing or driving lines may be formed of a substantially transparent metal oxide, such as indium tin oxide (ITO).

In another embodiment, the input device may include a touch-sensitive pad configured to sense at least one of a position and movement of a finger along a planar direction relative to a surface of the input device via capacitive sensing, resistance sensing, and/or via a surface acoustic wave (SAW) process. In yet another embodiment, the input device may be an optical imaging device and the surface of the optical imaging device a lens provided at an outer surface of the optical imaging device. By capturing images many times per second, the optical imaging device can accurately detect a position and movement of a finger along a planar direction relative to the lens surface of the input device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The methods and systems disclosed herein generally relate to wireless directional identification and communication between wearable heads-up displays. First, examples of wearable heads-up displays will be discussed, followed subsequently by discussions of their operation and input interaction.

1. Wearable Heads-Up Display Devices and Systems

Figure 1:
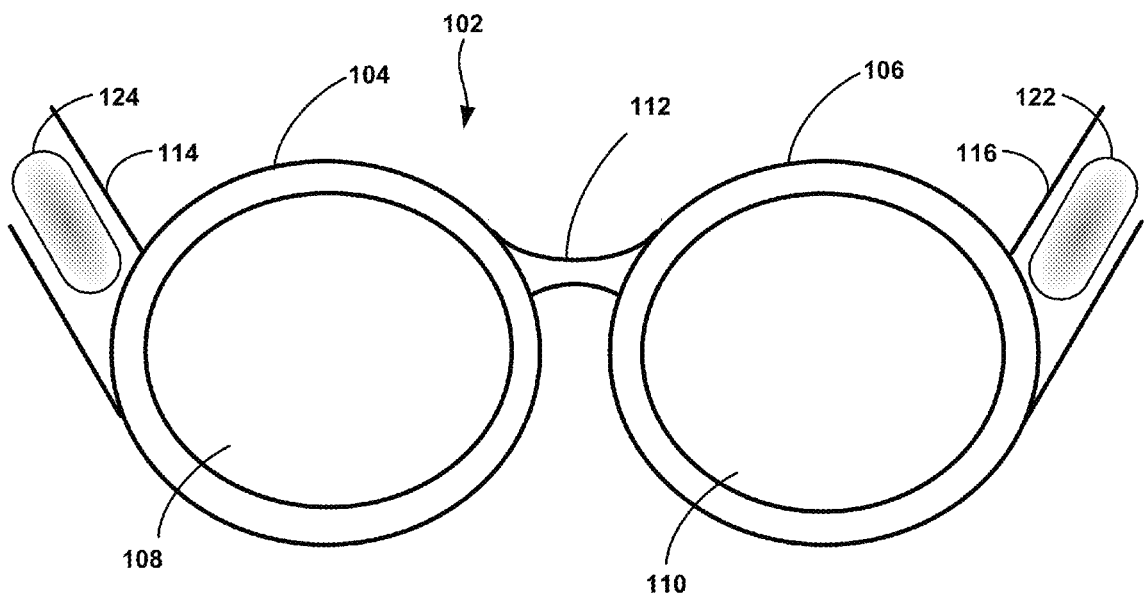
FIG. 1 shows an example embodiment of a wearable heads-up display with an integrated finger-tracking input sensor device.

FIG. 1 shows an example embodiment of a wearable heads-up display device. While FIG. 1 illustrates glasses 102 as an example of a wearable heads-up display device, other types of wearable heads-up displays could additionally or alternatively be used. As illustrated in FIG. 1, glasses 102 comprise frame elements including lens-frames 104, 106, respective lens elements 108 and 110, center frame support 112, two extending side-arms 114 and 116, and finger-operable touch pads 122, 124. The center support 112 and the two extending side-arms 114 and 116 are configured to secure the glasses 102 to a user's face via a user's nose and ears, respectively. Each of the frame elements 104, 106, 112 and side-arms 114, 116 may be formed of a solid structure of plastic or metal, or may be formed of a hollow structure of similar material so as to allow wiring and component interconnects to be internally routed through the glasses 102. Each of side-arms 114 and 116 is an example of a projection that extends away from a display element and is used to secure the display element to a user. The projection may be formed of a rigid or semi-rigid material such as plastic or metal, but may also be formed of other materials, including, for example, elastic or rubber. In addition to securing the display element to a user's ear, the projection may additionally or alternatively secure the display element to the user by extending around a rear portion of the user's head, or perhaps by connecting to a head-mounted helmet structure. Other possibilities exist as well.

Figure 2:
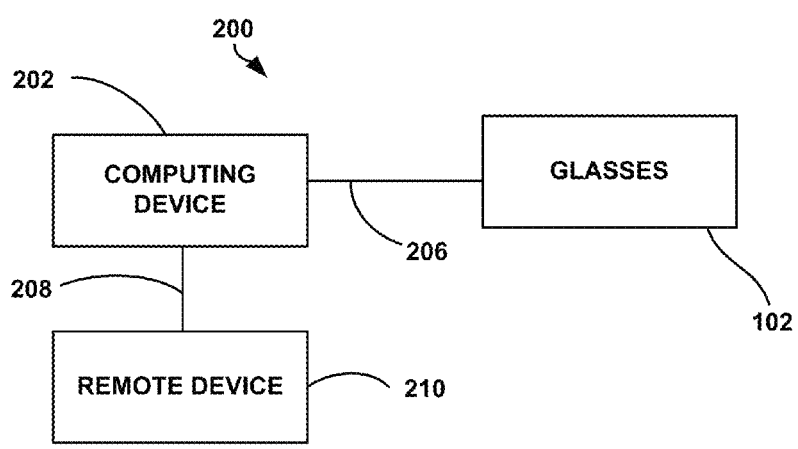
FIG. 2 shows a block diagram of an example embodiment of a wearable heads-up display system.

FIG. 2 shows an example embodiment of a wearable heads-up display system. As shown in FIG. 2, a wearable heads-up display system 200 may include glasses 102 coupled to a computing device 202 via a connection 206. The structure of computing device 202 will be described in more detail with respect to FIG. 9. In one embodiment, the computing device 202 may be incorporated into the glasses 102 themselves. In another embodiment, the computing device 202 may be a head-mounted computing device incorporated into, for example, a hat or helmet, or may be a body-mounted computing device incorporated into, for example, a waist-mounted cell phone or personal digital assistant. The connection 206 may be a wired and/or wireless link. A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities. The connection 206 may function to transmit data and/or commands to and/or from the glasses 102, to transmit input received from finger-operable touch pads 122, 124, and/or to transmit display data for display on respective lenses 108 and/or 110.

Figure 3:
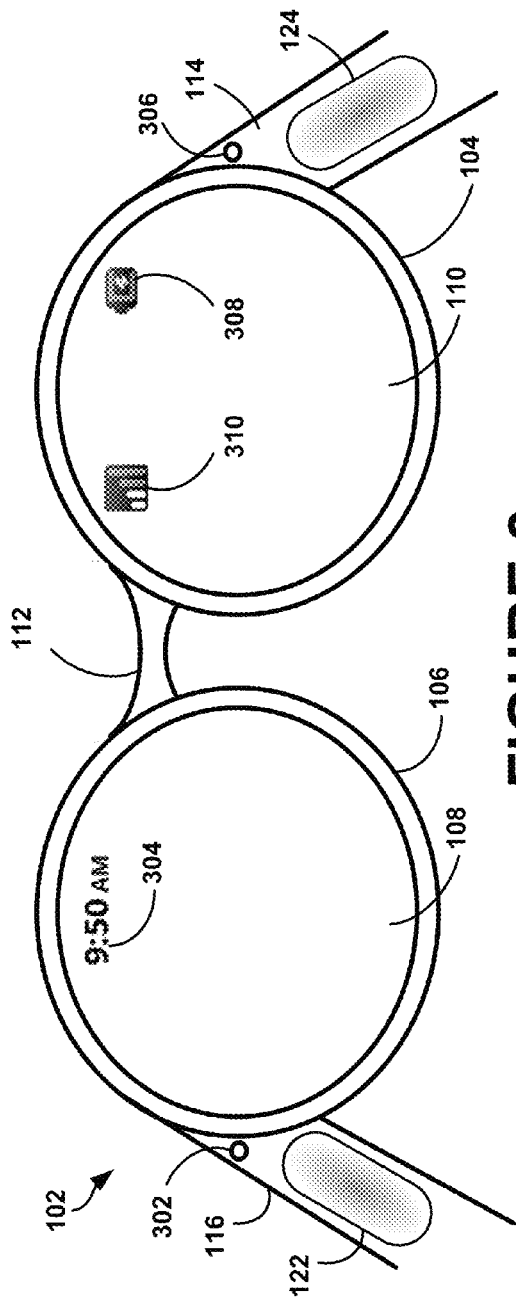
FIG. 3 shows an example embodiment of a wearable heads-up display device including display elements.

FIG. 3 shows an example embodiment of a wearable heads-up display device including display elements. As shown in FIG. 3, the lenses 108 and 110 may act as display elements. Glasses 102 may include a miniature projector 302 coupled to an inside-surface of side-arm 116 and configured to project a display onto an inside-surface of lens 108. For example, the projected display may include a current time 304. Additionally or alternatively, a second projector 306 may be coupled to an inside-surface of side-arm 114 and configured to project a display onto an inside-surface of lens 110. For example, the projected display may include a current battery-level 308 associated with the system 200. Additionally, a signal strength indicator 310 may provide a user with an indication of a signal strength associated with a wireless connection (such as connection 208 with remote device 210). While indicator 310 is illustrated as providing a plurality of signal strength bars, other types of signal strength displays could be used, such as a numeric text, a line-graph, etc.

In FIG. 3, the lenses 108 and 110 act as a combiner in a light projection system, and may include a coating that reflects the light projected onto them from the projectors 302, 306. In some embodiments, a special coating may not be required (e.g., when the projectors 302, 306 are scanning laser devices). Of course, other types of display elements could also be used. For example, the lens 108, 110 themselves may include a transparent or semi-transparent matrix display such as an electroluminescent (EL) display or liquid crystal display (LCD). A corresponding display driver may be disposed within the lens frames 104, 106 for driving such a matrix display. Alternatively or additionally, a laser or LED source and scanning system could be used to draw a raster display directly onto the retina of one or more of the user's eyes. Other possibilities exist as well.

Returning to FIG. 2, the wearable heads-up display system 200 may also communicate with a remote device 210 via the connection 208. Connection 208 may be a wired and/or wireless link having one or more characteristics described above in relation to connection 206. The remote device 210 may be a device associated with the wearable heads-up display system 200 (or a user thereof, not shown), and may be a cell phone, a personal data assistant (PDA), or some other device. For example, the remote device 210 may be a cell phone having Bluetooth capabilities, and may provide information for display on respective lenses 108 and/or 110, or may provide a target for transmission of data or instructions responsive to input operations received via finger-operable touch pads 122, 124. The connection 208 may comprise one or more base stations, routers, switches, LANs, WLANs, WANs, access points, or other network infrastructure. For example, remote device 210 may be accessible via the Internet, and may comprise a computing cluster associated with a particular web service (e.g., social-networking, photo sharing, address book, etc.).

Figure 4:
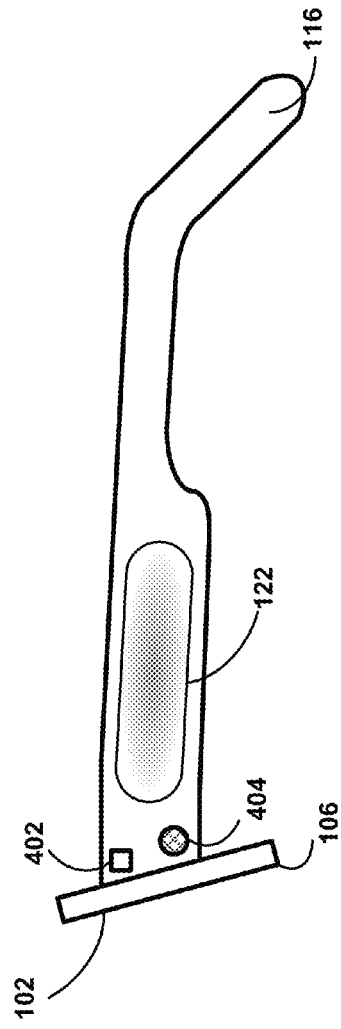
FIG. 4 shows an example embodiment of various input interfaces for a wearable heads-up display device, including an integrated finger-tracking input sensor device.

FIG. 4 shows an example embodiment of various input interfaces for glasses 102 that allows a user to interact with the glasses 102 and computing device 202. The input interfaces may comprise one or more of finger-operable touch pad 122, a movement sensor 402, and a microphone 404, among other possible input elements. While FIG. 4 illustrates a side-view of side-arm 116, additional and similar input interfaces may be provided on side-arm 114. For example, and as illustrated in FIG. 3, an additional finger-operable touch pad 124 may be provided on side-arm 114.

Returning to FIG. 4, the finger-operable touch pad 122 may sense at least one of a position and movement of a finger along a planar direction relative to a surface of the touch pad 122 (e.g., parallel to the surface of FIG. 4) via capacitive sensing, resistance sensing, and/or via a surface acoustic wave (SAW) process, among other possibilities. In addition, the finger-operable touch pad 122 may be capable of sensing movement of a finger in a direction normal to the surface of the touch pad 122 (e.g., into the surface of FIG. 4), including perhaps sensing a level of pressure applied to the touch pad 122.

In a capacitive touch pad, one or more insulating layers are coated with one or more conducting layers, and a driving signal applied to at least one of the one or more conducting layers. As a user's body acts as a conductor, touching the pad with one's finger causes a distortion in at least one of the conducting layer's electrostatic field, measurable as a change in capacitance. Different capacitive technologies may be used to determine the location of the touch. For example, in a surface capacitance method, only one side of an insulating layer is coated with a conductive layer. A small voltage is then applied to the conductive layer, resulting in an electrostatic field. When a user's finger touches the touch pad surface, a capacitor is dynamically formed, and a controller can determine the location of the touch indirectly from the change in capacitance. Alternatively, in a mutual capacitance method, vertically and horizontally-arranged driving lines (e.g., two conductive layers) are formed separated by an insulating layer. Bringing a finger close to the surface of the array changes the local electrostatic field around an intersection of the separated driving lines, changing the mutual capacitance between driving lines at corresponding intersecting areas. Because the capacitance change can be measured simultaneously at each intersecting point of the driving lines, mutual capacitance can be used to determine touch locations at a plurality of locations (e.g., multi-touch).

In a resistive touch pad, two electrically conductive layers having horizontal and vertical lines are formed separated by an insulating gap (e.g., glass, plastic, air, etc.), and a voltage gradient is applied to the first conductive layer. When contact is made with the surface of the touch pad, the two conductive layers are pressed together, and the second sheet measures the voltage as distance along the first sheet, providing an X coordinate. After the X contact coordinate has been acquired, a second voltage gradient is applied to the second sheet to ascertain the Y coordinate. These two operations provide the touch location that contact was made.

In a SAW touch pad, conductive layers are not disposed throughout the pad itself. Rather, transmitting and receiving transducers and reflectors are disposed at edges of the track pad. Waves emitted by the transmitting transducers are reflected across the touch pad in the X and Y directions and to receiving transducers via the reflectors. When a finger touches the screen, portions of the waves are absorbed, causing a touch event and its corresponding location to be detected by control circuitry.

While several types of touch pads are discussed here, other currently available and other future-developed touch-detection methods are included within the scope of this disclosure.

As illustrated in FIG. 4, a width of the side-arm 116 may be formed thicker in a region in which the touch pad 122 is formed, and thinner in a region in which the touch pad 122 is not formed, so as to accommodate sufficient space to detect finger movements in all planar directions (e.g., 360°), or at the very least, two pairs of diametrically opposed directions such as up, down, forward, and back.

Because the expanded width of the side-arm 116 in the region of the touch pad 122 may impede the peripheral vision of the user's eyes and/or may block the entrance of light, the side-arm 116 and/or the touch pad 122 may be formed of a translucent or substantially transparent material. For example, the side-arm 116 may be formed of a translucent or substantially transparent plastic material such as Acrylic (polymethlamethacrylate), Butyrate (cellulose acetate butyrate), Lexan (polycarbonate), and PETG (glycol modified polyethylene terphthalate). Other types of plastics could also be used. Translucent or substantially transparent materials other than plastic could also be used.

The touch pad 122 may be formed of one or more translucent or transparent insulating (e.g., glass or plastic) layers and one or more translucent or transparent conducting (e.g., metal) layers. The glass may be tempered or toughened glass manufactured through a process of extreme heating and rapid cooling. The plastic may be a polyimide, polyethylene, or polyester based plastic film. Other types of translucent and/or substantially transparent glasses and plastics could also be used. The conducting layer may be formed of a metal oxide, such as Indium Tin Oxide (ITO). Other types of insulating and conducting layers could also be used.

Edges of the touch pad 122 may be formed to have a raised, indented, or roughened surface, so as to provide tactile feedback to a user when the user's finger reaches the edge of the touch pad 122. Such a structure may also allow a user (who has limited or no visual cues as to the location of the touch pad 122) to locate the touch pad 122 on the side-arm 116 quickly, similar to the way in which physical indentions normally provided on the "F" and "J" keys of a keyboard allow a typist to quickly position their fingers correctly on the keyboard. Of course, the raised indented, and/or roughened surface could alternatively or additionally be formed in the side-arm 116 just past the edge of the touch pad 122. A similar roughened, raised, or indented element may be provided at substantially a center of the touch pad 122 to provide additional tactile cues to a user.

The movement sensor 402 may be provided on or in a frame element of the glasses 102, and may act as an input device configured to track a user's movements. The movement sensor 402 may include one or more of an accelerometer, a magnetometer, or a gyroscope, among other options. An accelerometer is a device that measures acceleration. Single- and multi-axis models can detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, and resonant solids to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used.

The movement sensor 402 may be used, for example, to determine when, how much, and perhaps how quickly, a user wearing the glasses 102 turns or moves his or her head or body to the right, left, tilted up, or tilted down. The sensor 402 may also be able to determine a cardinal direction in which the user is facing.

Microphone 404 may be any acoustic-to-electric transducer or sensor that converts sound into an electrical signal. For example, microphone 404 may use electromagnetic induction, capacitance change, piezoelectric generation, or light modulation, among other techniques, to produce an electrical voltage signal from mechanical vibration. The microphone 404 may communicate with a speech recognition program at computing device 202 to allow a user to speak voice commands that cause the computing device 202 to take particular action(s). The microphone 404 may also be used for other purposes.

While one touch-sensitive pad 122, one movement sensor 402, and one microphone 404 is illustrated in FIG. 4, in some embodiments a subset of these devices may be provided. In at least one embodiment, a plurality of touch-sensitive pads may be disposed on the side-arm 116 and/or the side-arm 114. In another embodiment, an array of (same or different) microphones or array of (same or different) movement sensors may be provided on the side-arm 116 and/or the side-arm 114. Additionally, the touch pad 122 may be provided having a different shape or dimensions than that shown in FIG. 4.

The input interface may be wiredly or wirelessly coupled to the computing device 202 (perhaps via connection 206) to allow a user to control settings and features of the wearable heads-up display system 200, to initiate communications with other wearable heads-up displays, to provide positioning and/or movement information from sensor 402, and/or to control and interact with displays on the lens 108, 110.

2. Input Interactions Using the Wearable Heads-Up Display System

Figure 5:
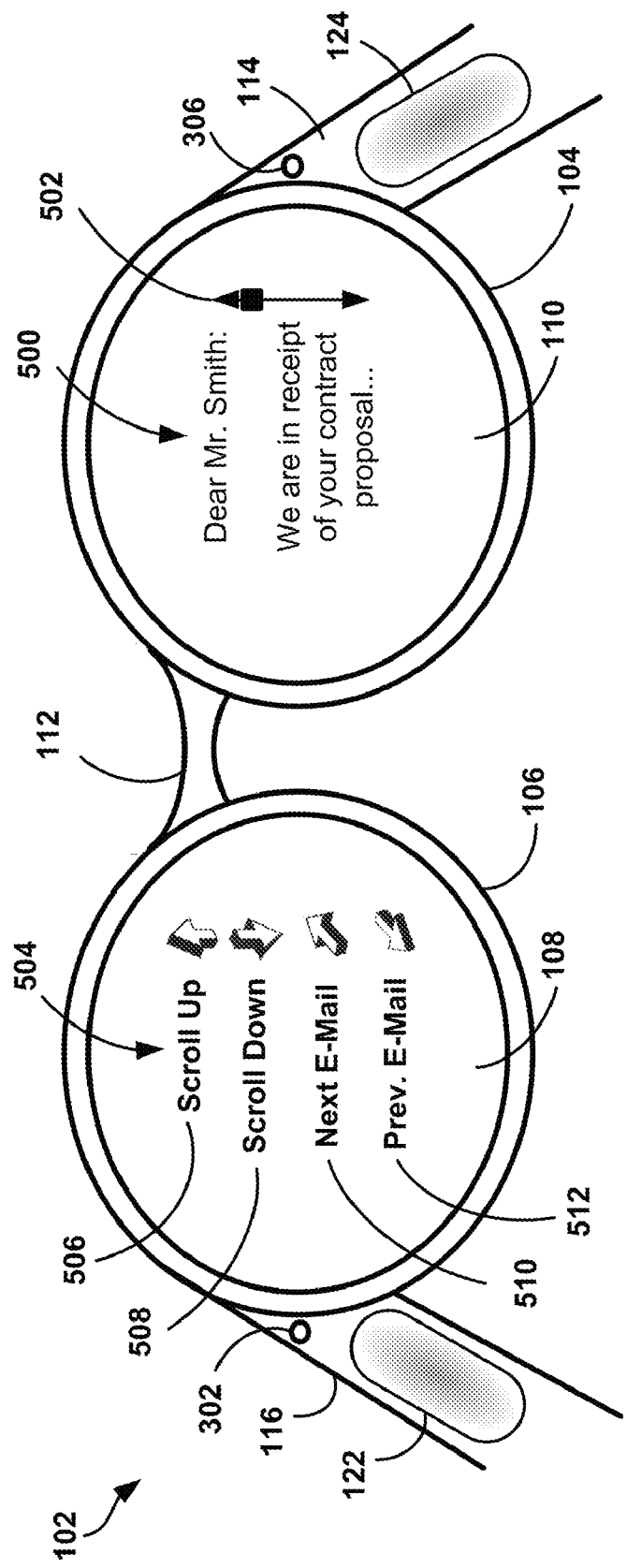
FIG. 5 illustrates an example method of interacting with a heads-up display device using the integrated finger-tracking input sensor device of FIG. 4.
Figure 6:
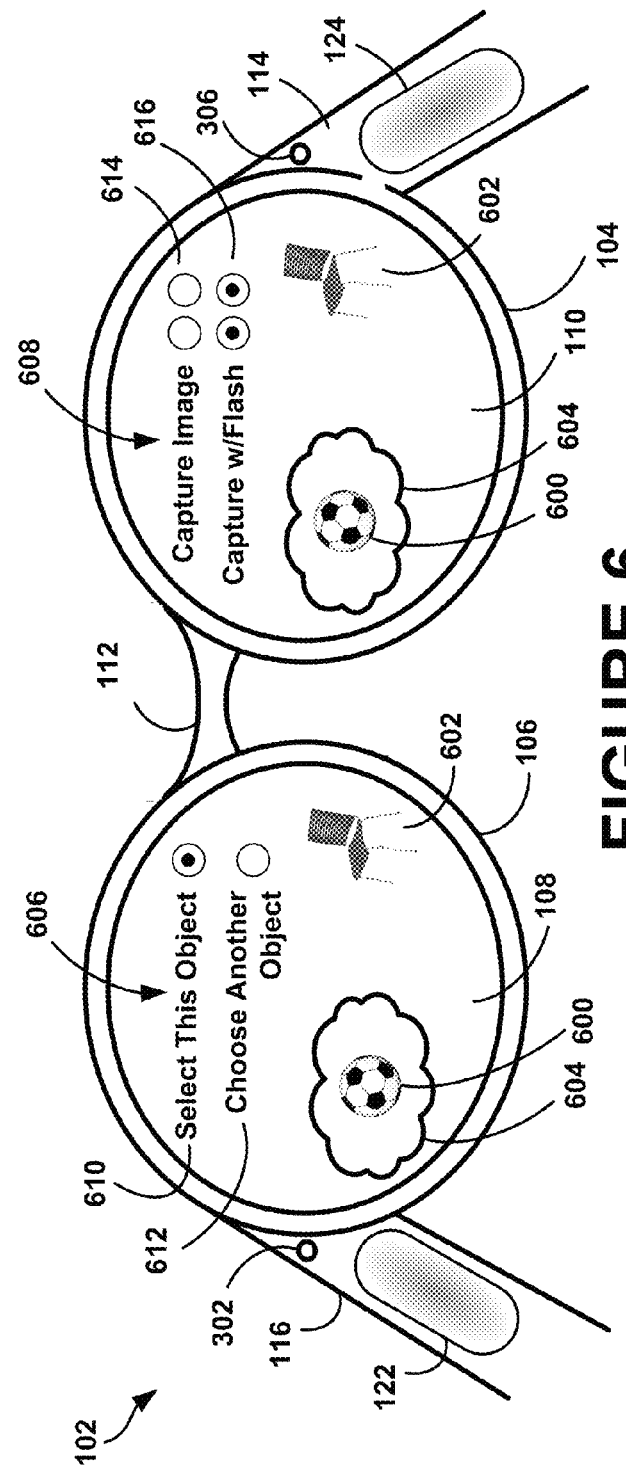
FIG. 6 illustrates another example method of interacting with a heads-up display device using the integrated finger-tracking input sensor device of FIG. 4.

FIGS. 5 and 6 illustrate example input interactions in which one or more of the touch pads 122, 124 may be used to interact with the glasses 102. FIG. 5 illustrates a display of input commands and their associated functions relative to a display of text (such as an e-mail), and FIG. 6 illustrates a display of input commands and their associated functions relative to interacting with real-world objects. Of course, these figures are exemplary in nature only, and many other applications and combinations of input commands and associated functions are possible in light of this disclosure.

FIG. 5 illustrates one embodiment in which interactions with displayed text (such as e-mails in an e-mail inbox) may be accomplished via one or more of the touch pads 122, 124. In this embodiment, either one of touch pad 122 or touch pad 124 may be operated, and the same input function performed by the glasses 102 in response to the input. One advantage of providing touch pads 122, 124 on respective sides of glasses 102 is that the same glasses 102 may be used naturally by both left-handed and right-handed persons.

Although FIG. 5 illustrates a simultaneous display of different content on both lenses 108 and 110, such simultaneous displays of content in overlapping regions of the bi-focal human vision field could confuse and/or disorient a user as a result of the brain's attempts to combine and make sense of the two differing displays. Accordingly, steps may be taken to prevent such confusion and/or disorientation. In one embodiment, both lenses 108, 110 may be populated with overlapping content, and a user may be expected or instructed to close one eye to focus on one lens 108, 110 at a time. In another embodiment, only one of the lenses 108, 110 is configured to contain the information illustrated in FIG. 5 at any one time. In a further embodiment, both lenses 108, 110 may be populated, but with corresponding overlapping portions of one of the displays 108, 110 eliminated, faded, blurred, or otherwise augmented to prevent visual confusion and/or disorientation at intersecting regions of the displayed content. Other possibilities exist as well.

As illustrated in FIG. 5, a content display 500 projected on lens 110 by projecting device 306 may include text of an e-mail, perhaps retrieved from an e-mail inbox associated with a user of the glasses 102 and stored at remote device 210. The e-mail text may represent just one e-mail out of a plurality of available e-mails. A scroll bar 502 may provide an indication of a relative position of the displayed text relative to a remainder of the e-mail from which the text is retrieved.

In order to aid a user in determining how to use touch pad 122 or 124 to interface with the content display 500, and prior to showing the content display 500, upon request, or at periodic intervals, a help display 504 intended to inform the user of available input commands that may be executed on one or more of touch pads 122 and 124, and of their associated functions, may be displayed on lens 108 via projecting device 302. During the time in which the help display 504 is being displayed, the content display 500 may be removed from lens 110, corresponding overlapping portions of the content display 500 augmented, or a user expected or instructed to close a corresponding eye looking through lens 110. In this example, the help display 504 includes a Scroll Up command 506, a Scroll Down command 508, a Next E-mail command 510, and a Previous E-mail command 512. Each of the commands 506-512 is displayed with a corresponding symbol illustrating an input operation that may be executed on one of the touch pads 122 and/or 124 to execute the associated function. For example, the Scroll Down command 508 may be executed by a user swiping their finger across touch pad 124 in a downwards direction (as indicated by the downward facing arrow symbol). In response to receiving the Scroll Down command, the computing device 202 may cause the content display 500 to be updated with additional text not previously displayed, and may cause the scroll bar 502 to advance downwards in accordance with a length of the e-mail from which the text is pulled. The Scroll Up command 506 (as indicated by the upward facing arrow symbol) may cause the content display 500 to be updated with previously displayed text, and may cause the scroll bar 502 to retract upwards in accordance with a length of the e-mail from which the text is pulled.

The Next E-mail command 510 may cause the content display 500 to be updated with text corresponding to a next e-mail (e.g., a more recently received or less recently received e-mail) from the e-mail inbox associated with the user. The Previous E-mail command 512 may cause the content display 500 to be updated with text corresponding to a previous e-mail that was, perhaps, previously shown in the content display 500. Other commands and other types of text, symbols, or images could be used as well.

In one embodiment, the commands and their associated functions may be modified by a user. For example, although in FIG. 5 a forward-swipe across touch pad 124 is associated with loading a next e-mail, it may be more intuitive for some users that a backward-swipe across touch pad 124 loads the next e-mail. Associations between commands and associated functions may, for example, be stored in a list or database in computing device 202 and/or at remote device 210. A locally or remotely accessible interface may allow the user to access the stored list or database and modify the associations. For example, the user may be able to access the computing device 202 and/or the remote device 210 via a wired or wireless connection, and modify the Next E-mail command to be associated with a backward-swipe across touch pad 124 instead of a forward-swipe. The computing device 202 (or remote device 210) may, in response to recognizing that the newly assigned backward-swipe was previously assigned to another function (the previous e-mail function), request the user to associate a new command with the previous e-mail function. In response, for example, the user may record a forward-swipe across touch pad 124 as being associated with the previous e-mail function. The selection of a new command may be executed by a user selecting the new command from a list, or may be executed by the user entering the new command via the touch pad 124 when requested (e.g., swiping forward across the touch pad 124 when requested). In this manner, unique patterns of input commands can be created by a user, and personalized per user, by recording a finger-motion pattern detected at the touch pad 124 when requested.

In one embodiment, the list or database stored at computing device 202 may be customized per application, such that, for example, the change to the Next E-mail command is applied to the e-mail function alone, and not to other functions, such as web browsing (e.g., a Next Link or Next Page command). In another embodiment the list or database may store global commands that, once changed, are applied to other related, or to all, functions executed at computing device 202. Other possibilities exist as well.

In some embodiments, the help display 504 may be displayed in lens 108 and/or 110 when the e-mail application is first started, so as to remind the user of the available input commands executable via touch pad 122 and/or 124 to navigate the e-mail application. After displaying the help display 504 for some period of time (e.g., 1-5 seconds), the help display 504 may be replaced with the content display 500 (in lens 108 and/or 110). Subsequently, the help display 504 may be displayed only upon demand (perhaps via a particular motion across touch pad 122 or 124 associated with displaying help display 504, a particular area of touch pad 122 or 124 associated with displaying help display 504, or an algorithm executing at computing device 202 that detects that a user is having difficulty navigating via touch pad 122 or 124). Computing device 202 may detect that a user is having difficulty navigating based on a number of unrecognized movements across touch pad 122 or 124, a number of times that a user "undoes" a previous command by subsequently doing the opposite (e.g., inputting the Next E-mail command once, and then the Previous E-mail command twice), or by some other combination of input and logic.

FIG. 6 illustrates an embodiment in which interactions with real world objects may be accomplished via one or more of the touch pads 122, 124. In this embodiment, each touch pad 122, 124 may be operated independently, and may provide different corresponding functions. When operating independently, one of the touch pads 122, 124 may be associated with a user's dominant hand, and the other may be associated with a user's non-dominant hand. For example, assuming a right-handed user is wearing the glasses of FIG. 6, touch pad 124 would be associated with the user's dominant hand, while touch pad 122 would be associated with the user's non-dominant hand. Different functions may be assigned to similar input operations executed at a respective touch pad 122, 124 based on this distinction.

As shown in FIG. 6, real-world objects 600 and 602 are viewable through translucent and/or transparent lenses 108, 110. For example, real-world object 600 is illustrated as a soccer ball, while real-world object 602 is illustrated as a chair. While objects 600 and 602 are shown twice (in lens 108 and 110), it should be understood that there is really only one of each object 600 and 602. The doubling of objects in FIG. 6 is meant to reflect the real-world binaural vision characteristics of the human-user (e.g., viewing the objects 600, 602 from two slightly different offset angles). Selection indicator 604 is a super-imposed selection indicator projected by one or more of projecting devices 302, 306 on respective lenses 108 and/or 110. A camera (not shown) disposed on glasses 102 may be configured to capture the user's field-of-view, and recognize particular objects for selection, such as the soccer ball 600 and/or chair 602. Help displays 606 and/or 608 may be projected on lenses 108, 110 to provide a user with options for interacting with the real-world objects 600, 602. Help displays 606 and 608 may be displayed in a similar manner, and subject to similar restraints, to those of displays 500 and 504. For example, help displays 606 and 608 may be displayed simultaneously, may be displayed only one at a time, or may be displayed such that one of the help displays 606, 608 is augmented in corresponding overlapping areas of help displays 606 and 608.

Help display 606 provides, for example, functions and associated commands for selecting an object recognized by computing system 202 (e.g., via the camera). For example, the selection indicator 604 may be displayed over a randomly selected object out of a plurality of objects recognized by the computing system 202 (or, perhaps, displayed over an object the that the glasses 102 detect that the user is most interested in). As shown in FIG. 6, the soccer ball 600 may be initially selected. The selection indicator 604 may be displayed in lens 108 and/or lens 110 via respective projecting devices 302, 304. The Select This Object command 610 of help display 606 may be executed by double-tapping the touch pad 124 with a single finger (illustrated with a symbol comprising a dot within an outer circle). Selecting the currently-highlighted object (e.g., the soccer ball in FIG. 6) in such a manner may allow for further functions to be executed with respect to the selected object. For example, once an object is selected, the selected object may be used as a focus-point for taking a picture via an imaging device (not shown) integrated with the glasses 102. Additionally or alternatively, an image or information search may be conducted using an image of the selected object. For example, an image of the soccer ball 600 may be used to locate other images of soccer balls via an online search function, to conduct an online product search function to find soccer balls available for purchase, or to obtain information regarding the sport of soccer or soccer balls in general (history, structure, etc.).

The Choose Another Object command 612 of help display 606 may be executed by a single-tap on the touch pad 124 with a single finger (illustrated with a symbol comprising an empty circle). The Choose Another Object command 612 may cycle through each of the plurality of recognized objects within the current field of view. For example, single-tapping touch pad 124 may cause the selection indicator 604 to move from the soccer ball 600 to the chair 602 (and may simultaneously cause the selection indicator 604 to change its shape to accommodate the size and/or geometries of the chair 602). Once the chair 602 is selected, the Select This Object command 610 may be executed via a double-tap using a single finger on touch pad 124 to find information and/or images with respect to the chair 602. Other possibilities exist as well.

Similar to the help display 504, the help display 606 may be displayed in lens 108 and/or 110 when the object selection application is first stated, so as to remind the user of the available input commands, executable via touch pad 122 or 124, to navigate the object selection application. After displaying the help display 606 for some period of time (e.g., 1-5 seconds), the help display 606 may be removed. Subsequently, the help display 606 may be displayed only upon demand (perhaps via a particular motion across touch pad 122 or 124 associated with displaying help display 606, a particular area of touch pad 122 or 124 associated with displaying help display 606, or an algorithm executing at computing device 202 that detects that a user is having difficulty navigating via touch pad 122 or 124).

Help display 608 provides, for example, functions and associated commands for capturing an image of a scene as viewed through lenses 108, 110, and as imaged by the integrated camera (not shown). For example, the selection indicator 604 may provide a focus point for an image capture process via commands 614 and 616. The Capture Image command 614 of help display 608, for example, may be executed by a two-finger single-tap on touch pad 124 (illustrated with a symbol comprising two adjacent empty circles), and may cause the camera to capture an image without a flash, using the currently-selected object 600 as the focal point. The Capture With Flash command 616 of help display 606, for example, may be executed by a two-finger double-tap on touch pad 124 (illustrated with a symbol comprising two adjacent dotes within respective outer circles), and may cause the camera to capture an image with a flash, using the currently-selected object 600 as the focal point. Similar to the disclosure above relative to help display 504, the input commands associated with the functions 614 and 616 may be modified by a user, and stored in computing device 202. Additionally, and similar to the disclosure above relative to help display 606, help display 608 may only be displayed as necessary, and otherwise, may be removed from lens 110.

As set forth earlier, touch pads 122 and 124 may be used to provide separate, independent input to the glasses 102. In the arrangement illustrated on lens 110 in FIG. 6, and assuming a right-handed user, touch pad 122 may provide gross motor movement of the selection indicator 604 for image capture focusing purposes, and touch pad 124 may provide fine motor movement of the selection indicator 604 (for the same or different purpose). For example, the touch pad 122 may allow a user to move the selection indicator 604 quickly to the top of the user's field of view via a relatively short upwards-swipe across the touch pad 122 (e.g., a full swipe across touch pad 122 in the vertical direction may cause a greater than 50% movement of the selection indicator 604 across a user's field of view). On the other hand, the touch pad 124 may allow the user to move the selection indicator 604 in small increments to fine tune the focus selection (e.g., a full swipe across touch pad 124 in the vertical direction may cause a less than 10% movement of the selection indicator 604 across a user's field of view). Other applications of using gross and fine motor input between touch pads 122 and 124 could also be implemented.

Figure 7A:
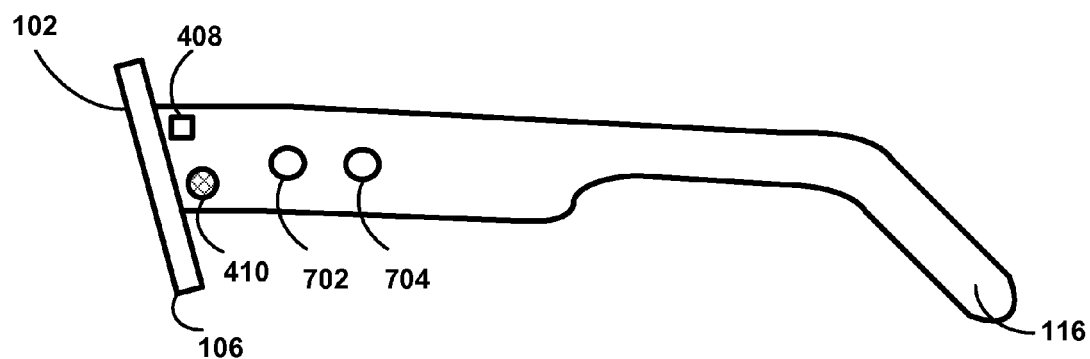
FIGS. 7a and 7b illustrate additional or alternative integrated finger-tracking input sensor devices.

FIG. 7a illustrates an additional or alternative embodiment for interacting with glasses 102. As illustrated in FIG. 7a, an image capture device 702 and a light source 704 may be coupled to side-arm 116 (in addition to, or in place of, touch pad 122). Although the light source 704 and image capture device 702 are illustrated as separate devices, they may be combined into a single device. The light source 704 and image capture device 702 work together to illuminate a surface of a user's finger, and to detect the unique, fine patterns in the surface of the user's finger. By capturing images of these patterns many times per second (e.g., on the order of hundreds or thousands per second), slight movements in the user's finger can be detected by comparing a reference frame (previous image) to a current frame (present image), and the difference transformed into corresponding movements for input to computing device 202. The light source 704 may be, for example, a laser or LED that emits light in the visible (e.g., red) or invisible (e.g., infra-red) spectrum. The image capture device 702 may be a complementary metal-oxide-semiconductor (CMOS) or charge-coupled device (CCD) image capture device capable of detecting wavelengths in the range emitted by the light source 704. Interfacing with glasses 102 via image capture device 702 and light source 704 may be accomplished in the same manner as set forth above with respect to FIG. 1-6.

Figure 7B:
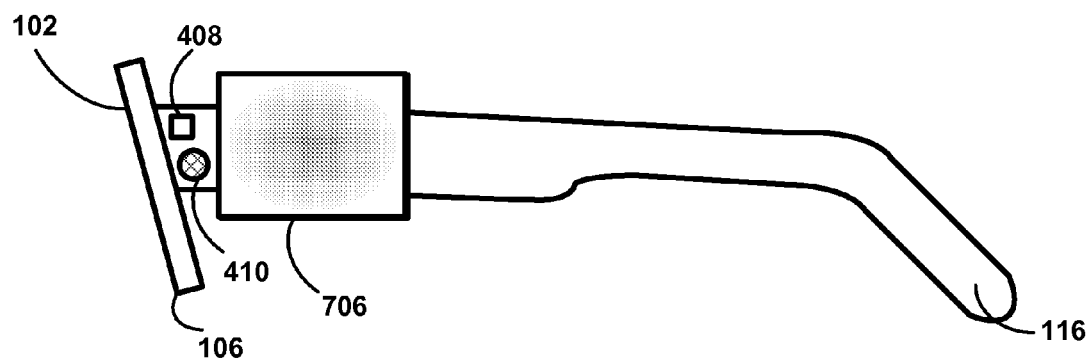

FIG. 7b illustrates another additional or alternative embodiment for interacting with glasses 102. As illustrated in FIG. 7b, a touch pad 706 may be coupled to side-arm 116 and extend beyond the edges of the side-arm 116. While this arrangement provides for additional gesturing space and allows a user to create more advanced input patterns, it also blocks more light from a user's field of view, and blocks a user's peripheral vision to a greater extent than the integrated touch pad 122 of FIG. 4. Thus, in this scenario, the level of translucency and/or transparency of the touch pad 706 may become more important. Additionally, and advantageously, the touch pad 706 in this arrangement may be removable from the side-arm 116, and may be attached only when needed by a heads-up display user. Removable fasteners may include, among others, Velcro, hook and tabs, buttons, snaps, friction fittings, screws, strike and latch fittings, compression fittings, rivets, and grommets. Permanent fasteners could additionally or alternatively be used. An electrical connection to the touch pad 706 may be provided via a connector on the outer-surface of the side-arm 116, and communication between the touch pad 706 and computing device 202 may take place via a wired or wireless connection. Interfacing with glasses 102 via touch pad 706 may be accomplished in the same manner as set forth above with respect to FIG. 1-6.

Although FIGS. 5-7 focus on input commands relative to touch pads 122 and/or 124, help displays 500, 504, 606, and 608, in one embodiment, may also include commands and corresponding symbols relative to movements detectable by movement sensor 408 and/or commands and symbols relative to voice commands detectable by microphone 410.

Figure 8:
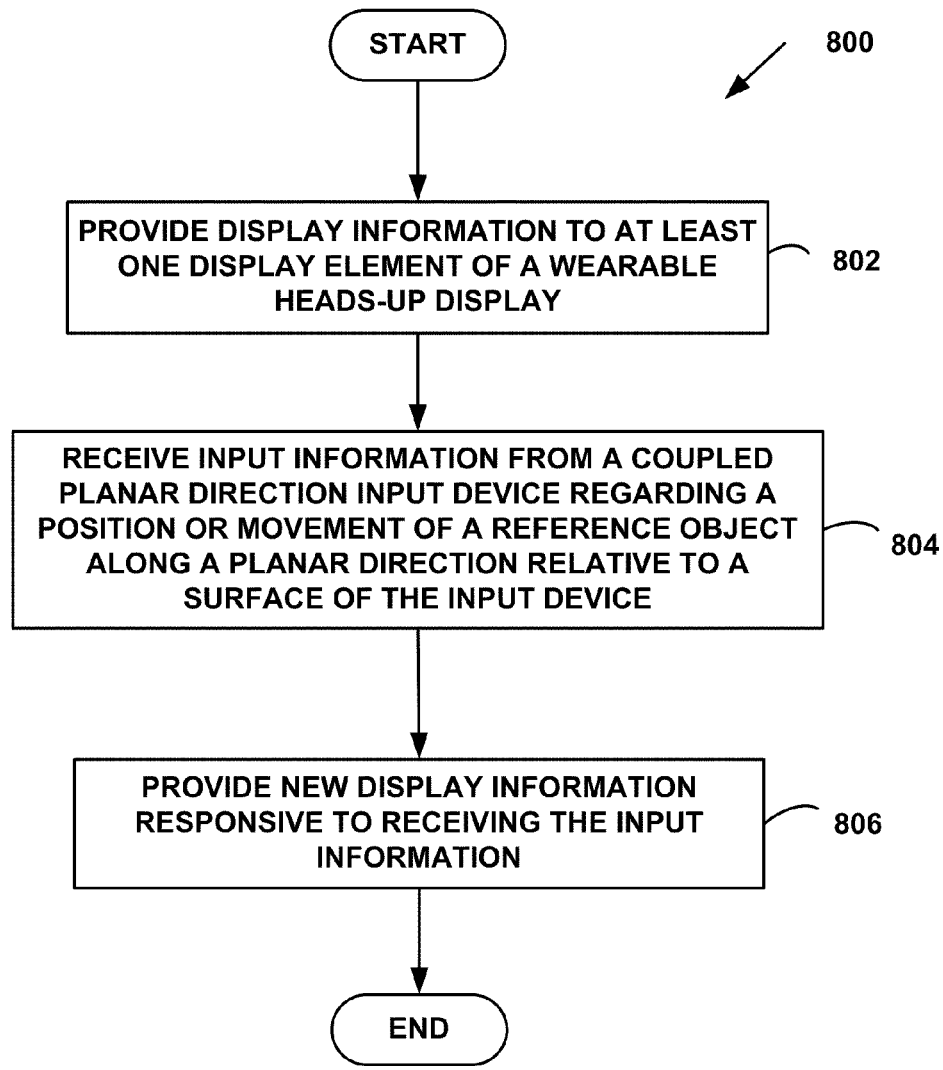
FIG. 8 is a flow-chart illustrating an example method of providing input to a wearable heads-up display device via an integrated finger-tracking input sensor device.

FIG. 8 is a flow-chart illustrating an example method 800 of interfacing with a heads-up display, such as glasses 102. The method 800 includes a first display step 802, an input step 804, and a second display step 806.

At step 802, display information is provided to at least one display element of a wearable heads-up display. This display information may include one or more supported functions relative to a currently-executing application, and may include, for each function, an associated input command (illustrated via a symbol) that may be executed at an input device to cause the corresponding function to be executed or corresponding selection to be selected. The associated input commands may be loaded from a list or database stored at computing device 202 and/or at remote device 210, and may vary depending upon a determination of the current application being executed by computing device 202.

At step 804, input information is received from a coupled finger-operable input device regarding a position or movement of a finger along a planar direction relative to a surface of the input device. This input information may be recognized as equal or equivalent to one of the associated input commands included in the display information at step 802. At step 806, new display information is provided to at least one display element (and perhaps the same at least one display element as in step 802) responsive to receiving the input information.

3. Example Hardware for a Wearable Heads-Up Display System

Figure 9:
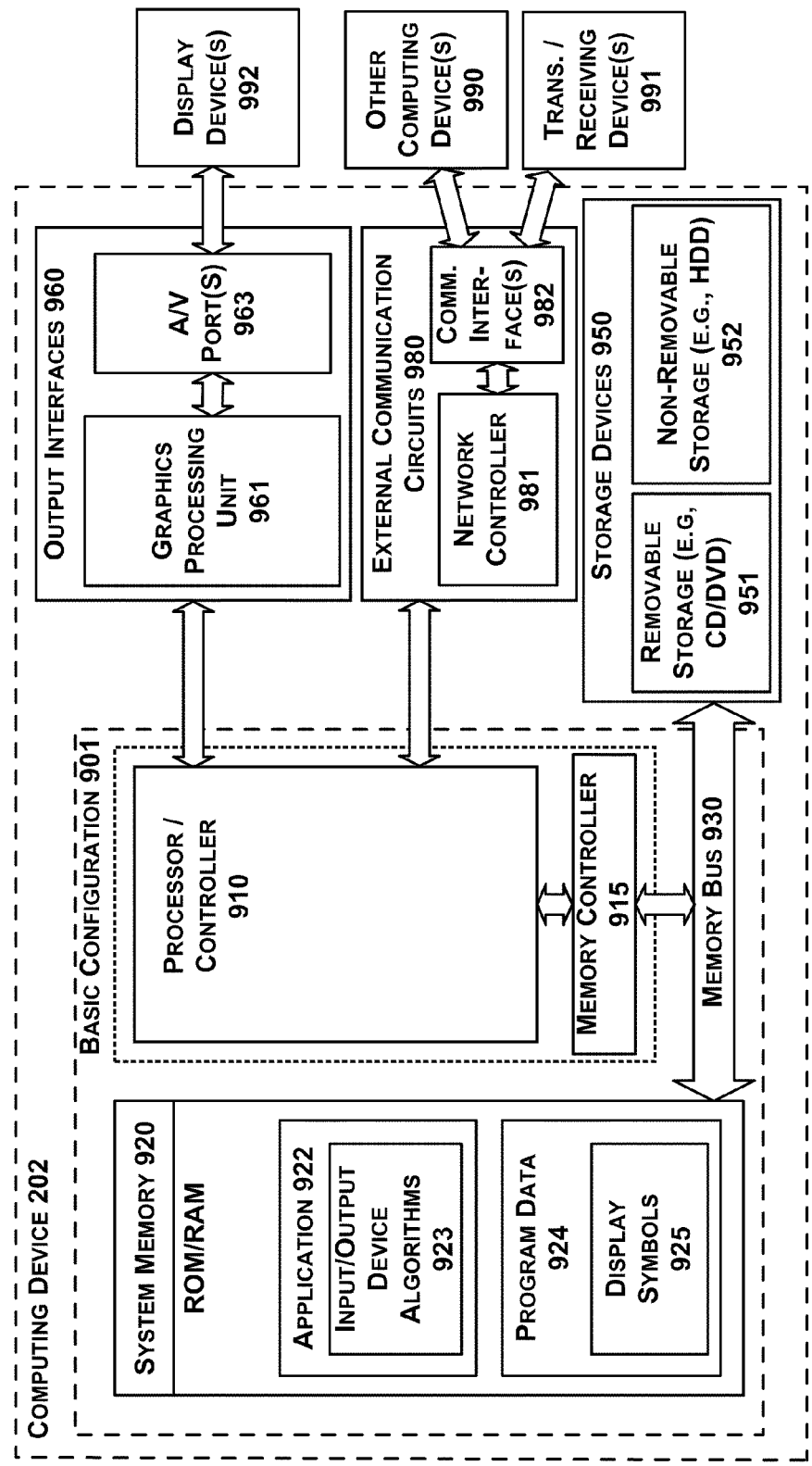
FIG. 9 is a functional block diagram of a computing device for supporting the wearable heads-up display device system of FIG. 2.

FIG. 9 is a functional block diagram of a computing device 202 for supporting the wearable heads-up displays set forth above arranged in accordance with at least some embodiments described herein. The computing device 202 may be a personal computer, mobile device, cellular phone, video game system, global positioning system, or other electronic system. In a very basic configuration 901, computing device 202 may typically include one or more processors or controllers (processor) 910 and system memory 920. A memory bus 930 can be used for communicating between the processor 910 and the system memory 920. Depending on the desired configuration, processor 910 can be of any type including, but not limited to, a microprocessor (µP), a microcontroller (µC), a digital signal processor (DSP), or any combination thereof. A memory controller 915 can also be used with the processor 910, or in some implementations, the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes one or more applications 922 and program data 924. Application 922 may include algorithms such as input/output device interface algorithms 923 arranged to control and interface with input devices such as finger-operable touch pads, in accordance with the present disclosure. Other process descriptions, steps, or blocks in flow or message diagrams in the present disclosure should be understood as potentially representing modules, segments, or portions of code which include one or more executable instructions stored in application memory 922 for implementing specific logical functions or steps in the process, and alternate implementations are included within the scope of the preferred embodiments of the methods in which functions may be executed out of order from that shown or discussed, including substantially concurrently or in reverse order, depending on the functionality involved, as would be understood by those reasonably skilled in the art.

Program data 924 may include, among other things, display symbols 925 that correspond to commands that may be executed via corresponding finger-operable touch pad operations (or other input interfaces), and that may be included in display data sent to one or more display devices 992. In some example embodiments, applications stored in application memory 922 can be arranged to operate with program data 924. Computing device 202 can have additional features or functionality, and additional interfaces to facilitate communications between the basic configuration 901 and any devices and interfaces. For example, the data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few.

Computer storage media can include volatile and nonvolatile, removable and non-removable media implemented in any method or technology for storage of information, such as computer readable instructions, data structures, program modules, or other data.

System memory 920, removable storage media for use with removable storage devices 951, and non-removable storage 952 are all examples of computer storage media. Computer storage media includes, but is not limited to, RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by computing device 202.

Computing device 202 can also include output interfaces 960 that may include a graphics processing unit 961, which can be configured to communicate to various external devices such as display devices 992 (which may include, for example, projecting devices 302, 306 and/or lenses 108, 110) or speakers via one or more A/V ports 963. External communication circuits 980 may include a network controller 981, which can be arranged to facilitate communications with one or more other computing devices 990 and/or one or more transmitting and/or receiving devices 991. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media. The term tangible computer readable media may refer to storage media alone.

Computing device 202 can be implemented as a portion of a small-form factor portable (or mobile) electronic device such as a cell phone, a multi-chip module (MCM), an application-specific integrated circuit (ASIC), a field-programmable gate array (FPGA), a PDA, a personal media player device, a wireless web-watch device, a personal headset device, an application specific device, or a hybrid device that include any of the above functions. Computing device 202 can also be implemented as a personal computer including both laptop computer and non-laptop computer configurations.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

Figure 10:
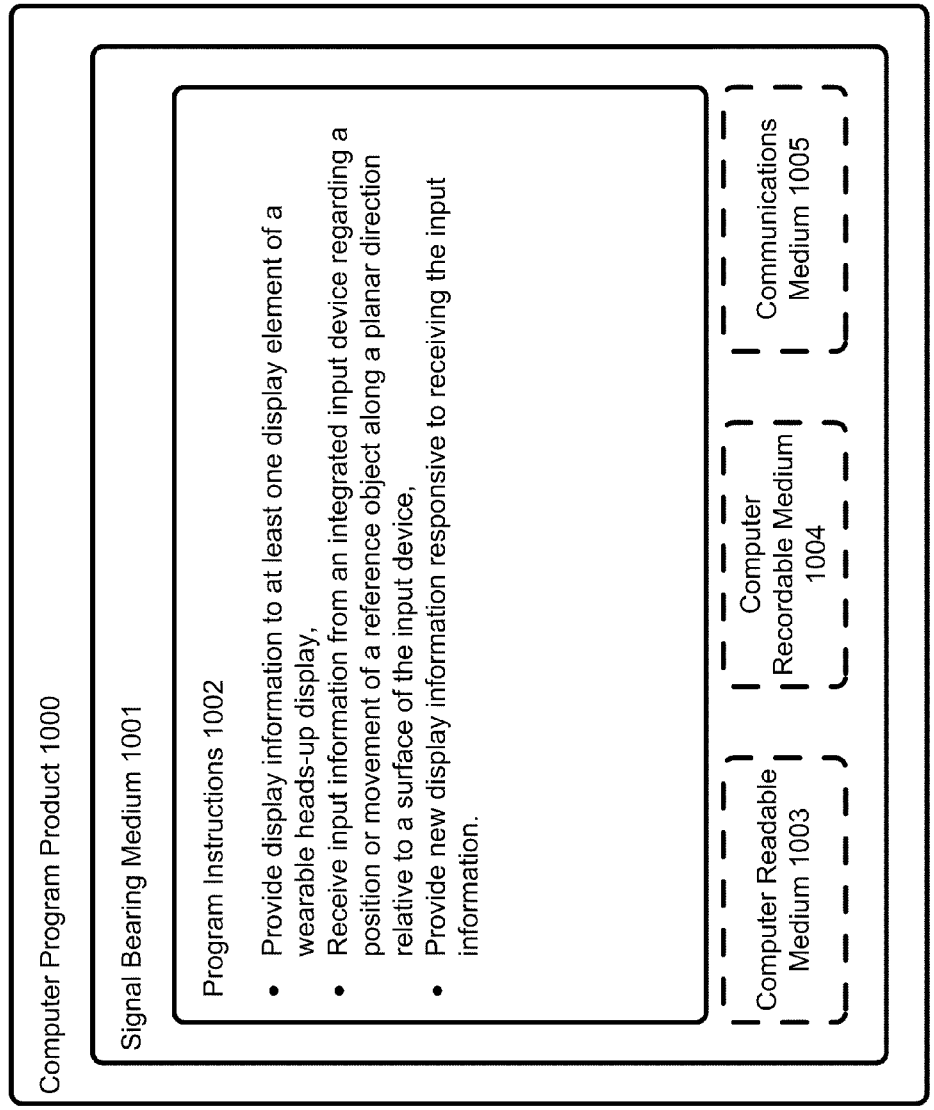
FIG. 10 is a schematic illustrating a conceptual partial view of an example computer program product.

In some embodiments, the disclosed methods may be implemented as computer program instructions encoded on a computer-readable storage media or tangible computer-readable storage media in a machine-readable format. FIG. 10 is a schematic illustrating a conceptual partial view of an example computer program product 1000 that includes a computer program for executing a computer process on a computing device, arranged according to at least some embodiments presented herein. In one embodiment, the example computer program product 1000 is provided using a signal bearing medium 1001. The signal bearing medium 1001 may include one or more programming instructions 1002 that, when executed by one or more processors, may provide functionality or portions of the functionality described above with respect to FIGS. 1-8. Thus, for example, referring to the embodiment shown in FIG. 8, one or more features of method 800 may be undertaken by one or more instructions associated with the signal bearing medium 1001.

In some examples, the signal bearing medium 1001 may encompass a tangible computer-readable medium 1003, such as, but not limited to, a hard disk drive, a Compact Disc (CD), a Digital Video Disk (DVD), a digital tape, memory, etc. In some implementations, the signal bearing medium 1001 may encompass a computer recordable medium 1004, such as, but not limited to, memory, read/write (R/W) CDs, R/W DVDs, etc. In some implementations, the signal bearing medium 1001 may encompass a communications medium 1005, such as, but not limited to, a digital and/or an analog communication medium (e.g., a fiber optic cable, a waveguide, a wired communications link, a wireless communication link, etc.). Thus, for example, the signal bearing medium 1001 may be conveyed by a wireless form of the communications medium 1005 (e.g., a wireless communications medium conforming with the IEEE 802.11 standard or other transmission protocol).

The one or more programming instructions 1002 may be, for example, computer executable and/or logic implemented instructions. In some examples, a computing device such as the computing device 202 of FIG. 9 may be configured to provide various operations, functions, or actions in response to the programming instructions 1002 conveyed to the computing device 202 by one or more of the computer readable medium 1003, the computer recordable medium 1004, and/or the communications medium 1005.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A wearable heads-up display comprising:
   a processor;
   two display elements, wherein at least one display element configured to receive display information from the processor and to display the display information;
   a pair of glasses, comprising a wearable frame structure supporting two display elements and having two projections disposed on opposite sides of the two display elements, each projection extending away from each respective display element, the projection configured to secure the heads-up display to a user body element in a manner that, when secured to the user body element, places the display elements within a field of view of the user;
   a first finger-operable input device secured to the wearable frame structure via a first of the two projections and configured to provide fine-motor input information to the processor and sense at least one of a position and movement of a finger along a planar direction relative to a surface of the first finger-operable input device, and to provide corresponding input information to the processor, wherein the first finger-operable input device is substantially transparent, and
   a second finger-operable input device secured to the wearable frame structure via a second of the two projections and configured to provide gross-motor input information to the processor and sense at least one of a position and movement of a finger along a planar direction relative to a surface of the second input device, and to provide corresponding input information to the processor.

2. The heads-up display of claim 1, wherein the processor is configured to transmit new display information to the display element responsive to receiving the input information.

3. The heads-up display of claim 1, wherein the display information comprises at least one symbol indicating a possible input operation that may be made via the input device and one of a function and a selection associated with the possible input operation.

4. The heads-up display of claim 1, wherein the input device is translucent.

5. The heads-up display of claim 1, wherein the input device comprises a glass substrate.

6. The heads-up display of claim 1, wherein the input device comprises a plastic substrate.

7. The heads-up display of claim 1, wherein the input device comprises one or more conductive layers formed of a substantially transparent metal oxide.

8. The heads-up display of claim 1, wherein the input device is one of a capacitive sensing, resistance sensing, and surface acoustic wave (SAW) touch sensitive pad.

9. The heads-up display of claim 1, wherein the input device is an optical imaging device and the surface of the optical imaging device is a lens provided at an outer surface of the optical imaging device.

10. A method of providing input to a wearable heads-up display having a wearable frame structure supporting two display elements, where each display element has at least one projection extending away from the display element, each projection configured to secure the heads-up display to a user body element in a manner that, when secured to the user body element, places each display element within a field of view of the user, the method comprising:

provided, via a processor coupled to the wearable frame structure, display information to at least one display element of the two display elements;

receiving at the processor, via one of at least two finger-operable substantially-transparent input devices secured to the wearable frame structure and configured to sense at least one of a position and movement of a finger along a planar direction relative to a surface of the input devices, corresponding input information representative of the at least one of the position and movement of the finger along the planar direction, wherein a first finger-operable substantially-transparent input device is secured to the wearable frame structure via a first projection and configured to provide fine-motor input information to the processor, and a second finger-operable substantially-transparent input device secured to the wearable frame structure via a second projection and configured to provide gross-motor input information to the processor; and providing, via the processor, new display information to the at least one display element responsive to receiving the input information.

11. The method of claim 10, wherein the display information comprises at least one symbol indicating a possible input operation that may be made via the input device and one of a function and a selection associated with the possible input operation, and wherein receiving corresponding input information comprises receiving an indication of the possible input operation.

12. An article of manufacture including a computer readable medium having instructions stored thereon that, in response to execution by a computing device of a wearable heads-up display having a wearable frame structure supporting two display elements, where each display element has at least one projection extending away from the display element, each projection configured to secure the heads-up display to a user body element in a manner that, when secured to the user body element, places each display element within a field of view of the user, cause the computing device to perform operations comprising:

providing display information to at least one display element of the two display elements coupled to the wearable frame structure;

receiving at the processor, via one of at least two finger-operable substantially-transparent input device secured to the wearable frame structure and configured to sense at least one of a position and movement of a finger along a planar direction relative to a surface of the input device, corresponding input information representative of the at least one of the position and movement of the finger along the planar direction, wherein a first finger-operable substantially-transparent input device is secured to the wearable frame structure via a first of the two projections and configured to provide fine-motor input information to the processor, and a second finger-operable substantially-transparent input device secured to the wearable frame structure via a second of the two projections and configured to provide gross-motor input information to the processor; and providing new display information to the at least one display element responsive to receiving the input information.

* * * * *